UNITED STATES PATENT OFFICE.

EDWARD D. GLEASON, OF NEW YORK, N. Y., ASSIGNOR TO NEW-METALS AND PROCESS COMPANY, OF BROOKLYN, NEW YORK, A CORPORATION OF NEW YORK.

ALLOY.

1,169,536.      Specification of Letters Patent.      Patented Jan. 25, 1916.

No Drawing. Original application filed November 16, 1912, Serial No. 731,863. Divided and this application filed January 20, 1915. Serial No. 3,382.

*To all whom it may concern:*

Be it known that I, EDWARD D. GLEASON, of Brooklyn, in the county of Kings, city and State of New York, have invented a certain new and useful Improvement in Alloys, whereof the following is a specification.

My invention relates to the purifying and casting of copper and alloys thereof; the object of my invention being to eliminate oxygen and other gases which if allowed to remain render such castings porous.

This is a division of my application Serial 731,863, filed November 16, 1912, which is limited to the process herein contemplated.

In practising my invention I incorporate boron in copper, as graphite exists in cast iron, by fusing them in a crucible, free from impurities, with a flux consisting of native calcium fluorid and fused boracic acid. For instance, in a crucible of magnesite, or graphite free from arsenic balls; I put three parts of calcium fluorid, and, on top of that, one part of fused vitrified boracic acid. I then fuse the same, preferably in an oxy-hydrogen furnace of ordinary commercial type, until the fused mass of said two ingredients has reached the proper consistency; which is manifested by dense fumes of boron fluorid arising from the crucible. I then pour into said fused mass molten copper at a temperature of about 2500 degrees F. or higher. Thereupon, the boron fluorid permeates the molten copper and when the latter is cooled the boron exists therein as graphite exists in cast iron.

It may be observed that it is impossible to obtain an equivalent effect by placing calcium fluorid and fused boracic acid on top of the molten copper, for, in that case, the mixture of said fluorid and acid simply acts as a cover to the copper in the form of a slag, the specific gravity thereof preventing it from sinking into the copper. Moreover, said fluorid and acid are of such nature that they cannot be successfully shot under the molten copper. However, said materials may be added to the molten copper, so as to react at the bottom thereof, by wrapping them in thin sheet copper and sinking the package in the molten copper.

Before my invention, it was known that pure boron, boron carbid, boron suboxid, or other boron material capable of being oxidized to form boron trioxid might be added to molten copper to combine with oxygen and other gases in the molten mass, to eliminate such gases, so that copper thus treated would form castings free from blow holes or other defects due to the occlusion of such gases in such metal. However, boron (or the derivatives thereof above contemplated) if added to molten copper, leaves the same with the slag, so that the residue of metal is destitute of boron material of any kind. On the contrary, it is the primary object of my invention to provide copper retaining boron material throughout its mass when congealed, so that such boron impregnated copper may be used in variable proportions in mixture with ordinary copper and other metals, for instance, in alloys of copper with lead, and with lead and tin, to cause them to mix homogeneously and impart to them different degrees of hardness with a given percentage of copper in accordance with the amount of such boron copper included in the mixture, as set forth in my Letters Patent of the United States 1,066,403 and 1,066,428 granted July 1, 1913. The attainment of said object, in accordance with my invention, is dependent upon the occlusion of the boron material in the molten copper by the injection of the gaseous boron fluorid into the copper so as to be homogeneously distributed throughout the mass thereof. Therefore, I do not desire to limit myself to the precise methods of procedure or proportions herein set forth, as it is obvious that various modifications may be made therein without departing from my invention as defined in the appended claims. However, I disclaim any product of the method or process described in Letters Patent of the United States #1,023,604 granted to Ezechiel Weintraub, April 16, 1912, as assignor to General Electric Company.

I claim:—

1. Copper containing boron material in excess of a trace.

2. Copper containing boron material occluded throughout its mass in excess of a trace.

3. A composition containing approximately 99% copper and boron material in substantial excess of a trace.

In testimony whereof, I have hereunto signed my name at Brooklyn, New York, this twelfth day of January, 1915.

EDWARD D. GLEASON.

Witnesses:
HENRY J. MEYER,
WM. BEKOWSKI.

It is hereby certified that the assignee in Letters Patent No. 1,169,536, granted January 25, 1916, upon the application of Edward D. Gleason, of New York, N. Y., for an improvement in "Alloys," was erroneously described and specified as "New-Metals and Process Company," whereas said assignee should have been described and specified as *Neu-Metals and Process Company*, as shown by the records of assignments in this Office; and that the said Letters Patent should be read with this correction therein that the same may conform to the record of the case in the Patent Office.

Signed and sealed this 8th day of February, A D., 1916.

[SEAL.]

R. F. WHITEHEAD,

*Acting Commissioner of Patents.*

Cl. 75—1.